United States Patent
Genick, II et al.

(10) Patent No.: US 6,842,938 B2
(45) Date of Patent: Jan. 18, 2005

(54) ASSEMBLY FOR REMOVING DEBRIS FROM A WINDSHIELD

(75) Inventors: Raymond M. Genick, II, Waterford, MI (US); John Edward Campbell, Hazel Park, MI (US)

(73) Assignee: W3 Technologies LLC, New Hudson, MI (US)

( * ) Notice: Subject to any disclaimer, the term of this patent is extended or adjusted under 35 U.S.C. 154(b) by 0 days.

(21) Appl. No.: 10/271,134

(22) Filed: Oct. 15, 2002

(65) Prior Publication Data

US 2004/0068821 A1 Apr. 15, 2004

(51) Int. Cl.[7] .............................................. B60S 1/32
(52) U.S. Cl. ............................. 15/250.19; 15/250.351
(58) Field of Search ...................... 15/250.19, 250.001, 15/250.351, 250.21, 250.23

(56) References Cited

U.S. PATENT DOCUMENTS

| | | | | |
|---|---|---|---|---|
| 2,784,438 A | * | 3/1957 | Petersen ................... | 15/250.19 |
| 5,274,875 A | * | 1/1994 | Chou ....................... | 15/250.19 |
| 5,301,384 A | | 4/1994 | Perry ....................... | 15/250.4 |
| 5,442,834 A | | 8/1995 | Perry ....................... | 15/250.4 |
| 5,487,204 A | * | 1/1996 | Nelson ..................... | 15/250.19 |
| 5,867,858 A | | 2/1999 | Kelly ....................... | 15/250.19 |
| 6,129,093 A | | 10/2000 | Kelly ....................... | 15/250.19 |
| 6,471,784 B2 | * | 10/2002 | Lahti ....................... | 134/42 |
| 6,622,338 B1 | * | 9/2003 | Chen et al. ............... | 15/250.19 |

FOREIGN PATENT DOCUMENTS

| | | | |
|---|---|---|---|
| DE | 3731921 | * | 12/1988 |
| JP | 4-85150 | * | 3/1992 |
| JP | 5-162616 | * | 6/1993 |

* cited by examiner

*Primary Examiner*—Gary K. Graham
(74) *Attorney, Agent, or Firm*—Clark Hill PLC

(57) ABSTRACT

A wiper assembly wipes precipitation and debris of a windshield of a motor vehicle. The wiper assembly includes a drive motor fixedly secured to the motor vehicle. The wiper assembly also includes a wiper arm secured to the drive motor. The drive motor pivots the wiper arm across the windshield to clean the windshield. The wiper arm extends between a motor end and a distal end. The wiper arm also includes a separator extending along the wiper arm. The separator lifts the wiper arm away from the windshield allowing for the removal of debris from the windshield and the wiper arm.

9 Claims, 11 Drawing Sheets

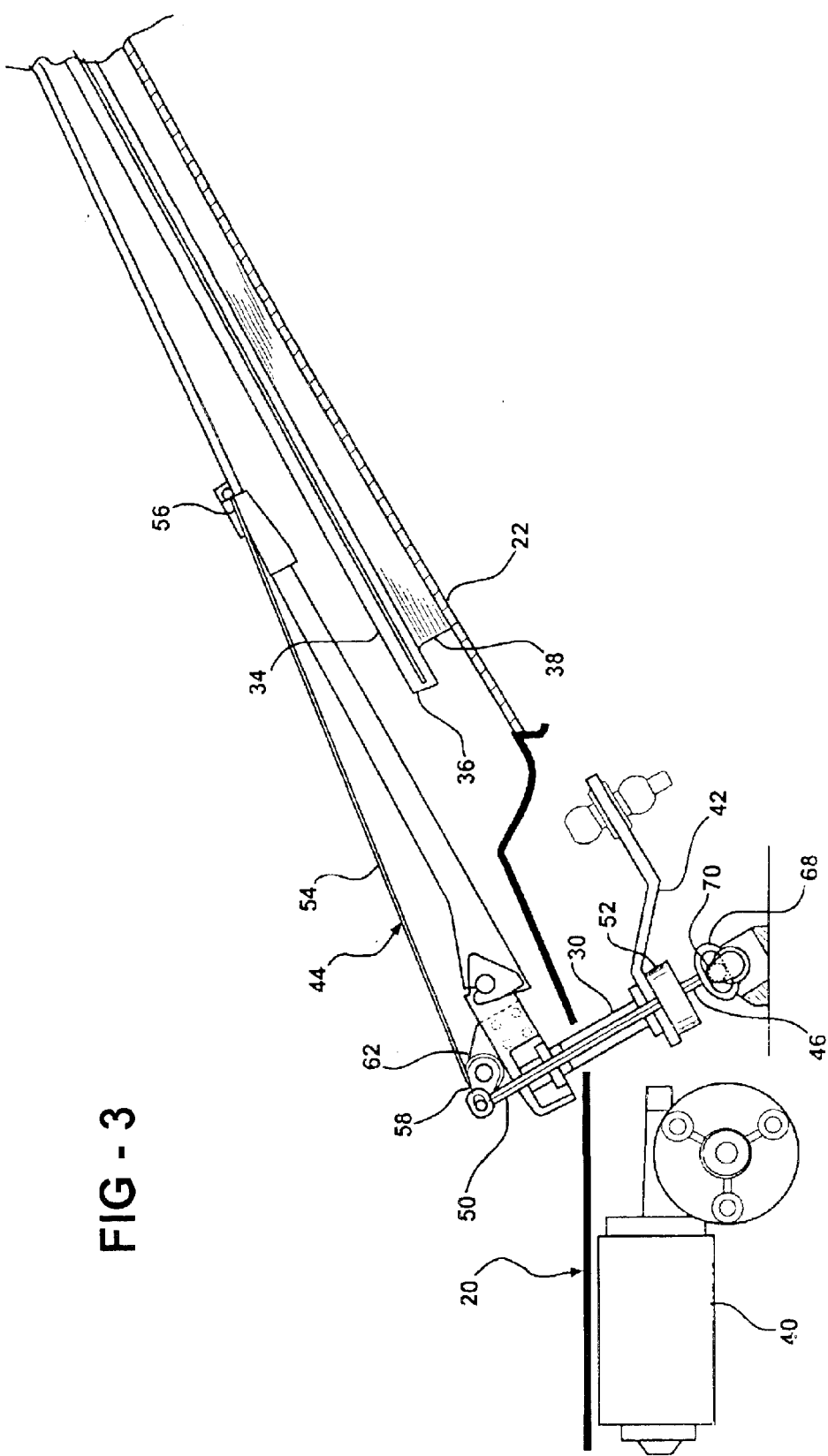

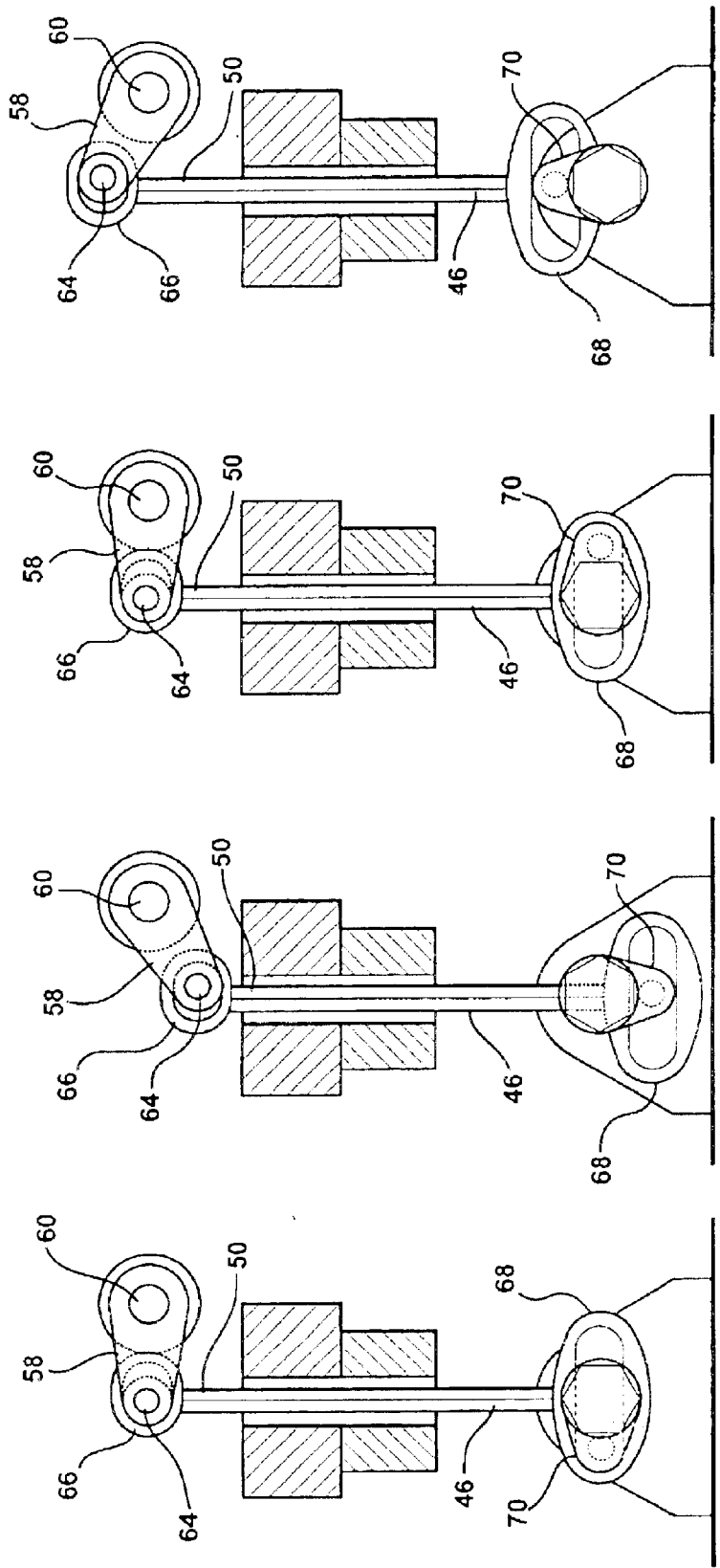

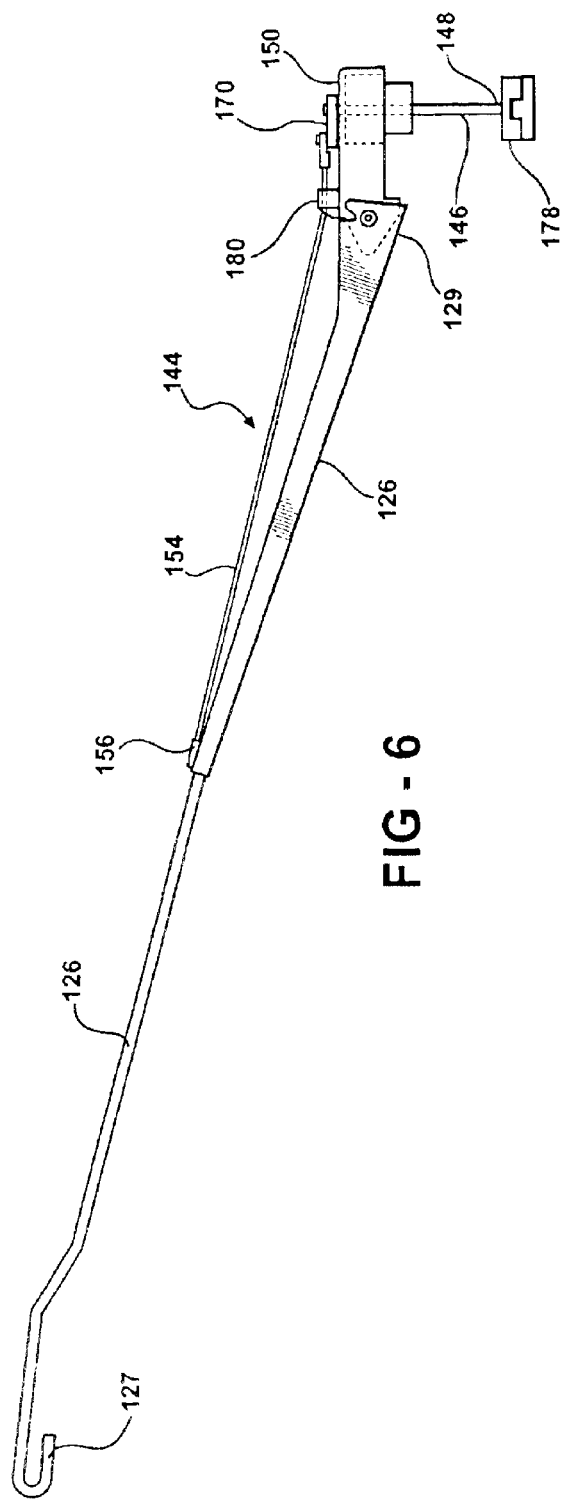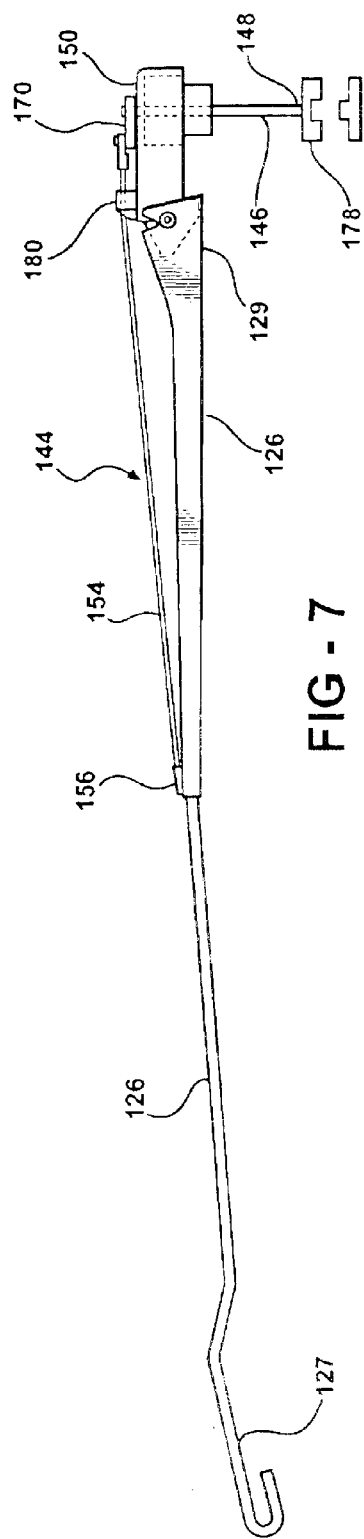

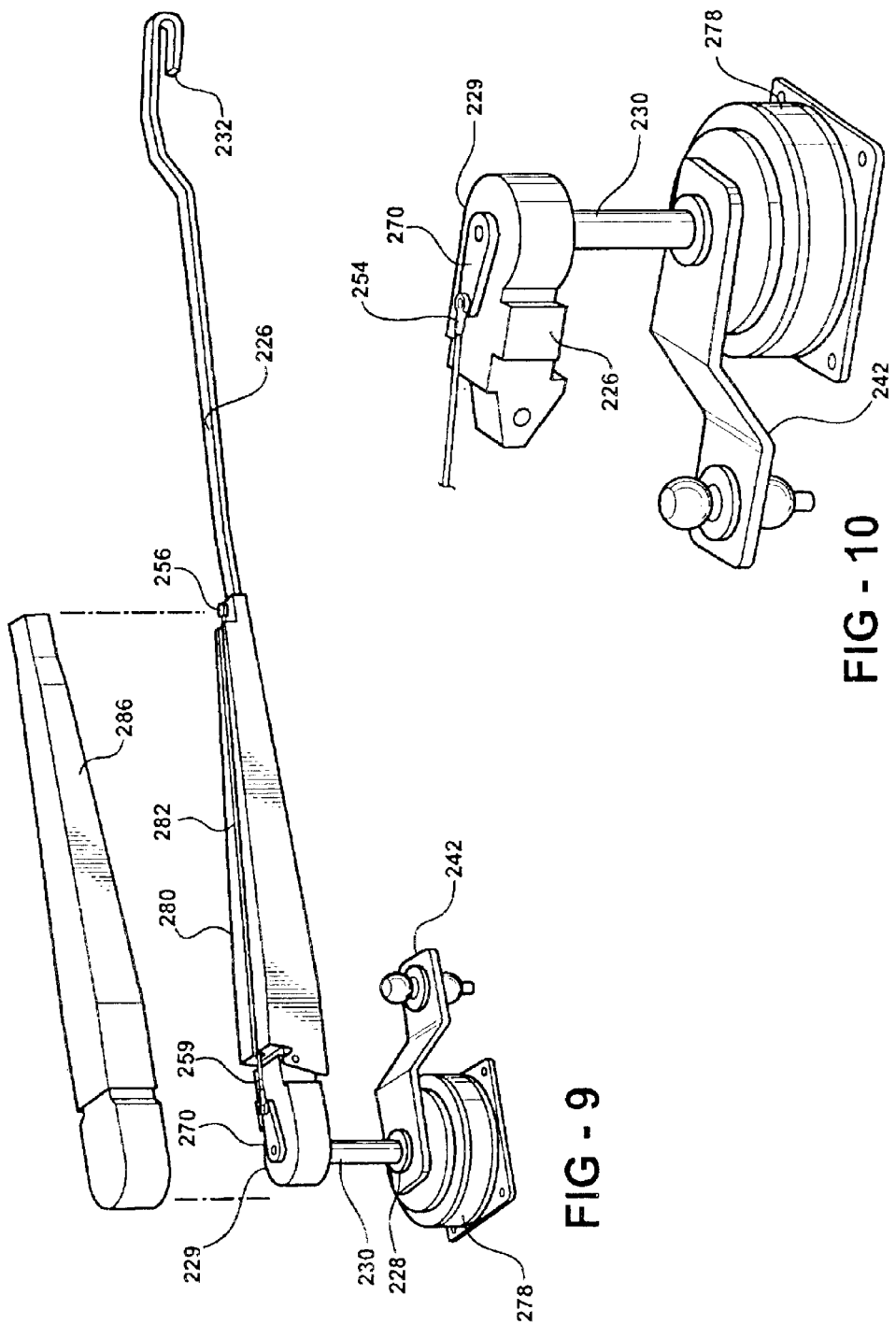

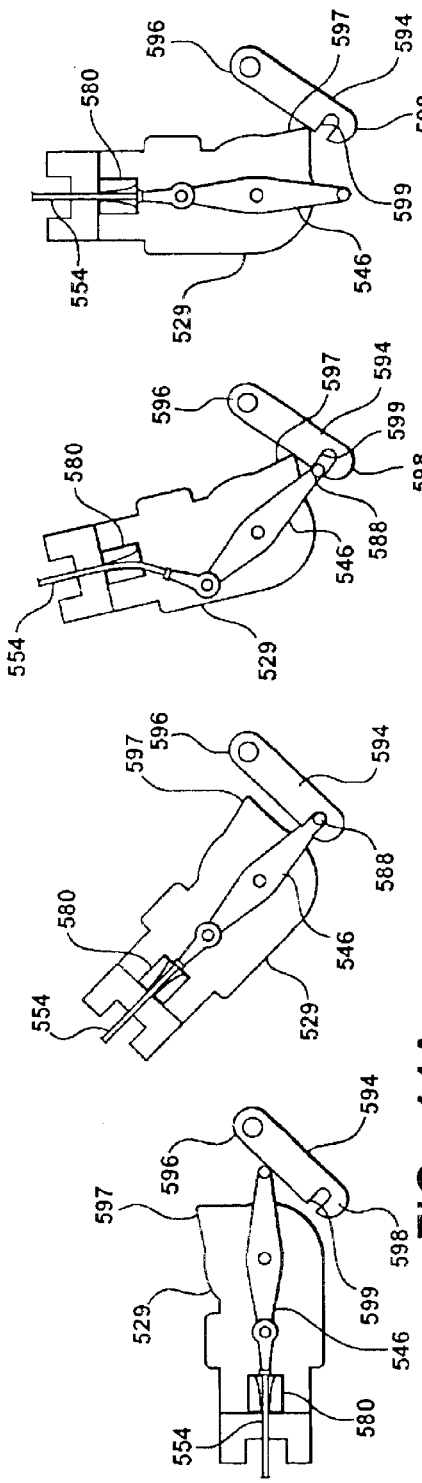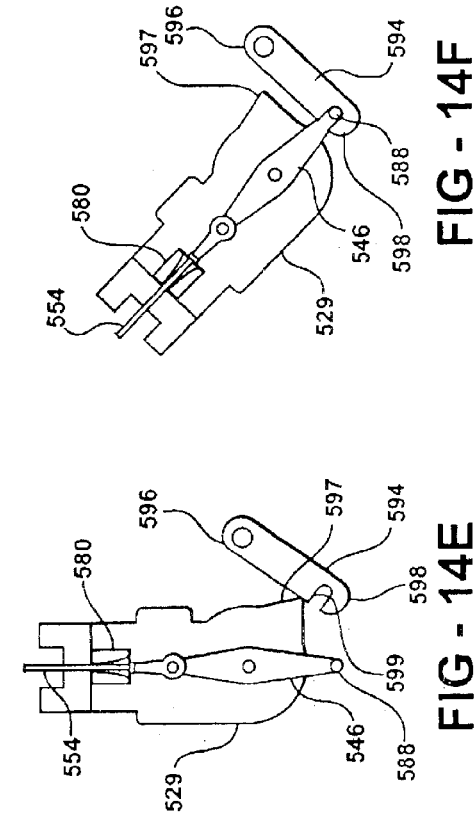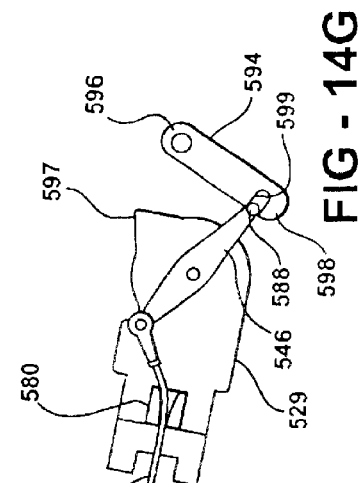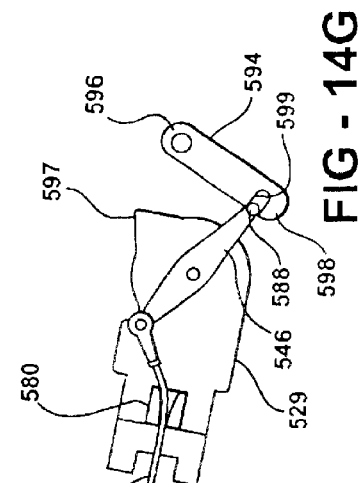

ASSEMBLY FOR REMOVING DEBRIS FROM A WINDSHIELD

BACKGROUND ART

1. Field of the Invention

The invention relates to a wiper assembly for a motor vehicle. More particularly, the invention relates to a method and assembly for removing debris from a wiper assembly for a motor vehicle.

2. Description of the Related Art

In the early days of the automobile, systems that were used to clean a windshield were optional. Oftentimes, a cleaning apparatus was an aftermarket accessory installed by the owner of the automobile. These cleaning systems varied in how they operated and to what extent they cleaned the windshield. In many instances, the cleaning apparatus only removed water and debris from the driver's side of the windshield.

As the speed of the motor vehicle increased, so to increased the requirement for a clean windshield at all times. Coupled with increased congestion on the roadways, a clean windshield became less of a luxury and more of a requirement. Therefore, cleaning systems for the windshield became more mainstream and, as such, these systems were installed as a standard feature by the original equipment manufacturers.

Currently, the standard system used for cleaning a windshield is a wiper assembly. The wiper assembly is commonly referred to as a windshield wiper. The wiper assembly consists of one or two wiper arms moving over the windshield allowing a wiper blade secured to the end of the wiper arm to push water and debris off the windshield. The wiper blade is fabricated from an elastomeric material allowing it to conform to the shape of the windshield. The effectiveness of the wiper assembly is directly related to the ability for the wiper blade to engage the windshield along its entire length.

The operation of the wiper assembly is hindered when debris manages to be collected underneath the wiper blade. The debris, e.g., a leaf, may obstruct the view of the driver of the motor vehicle and prevent the uniform removal of water from the windshield. This makes it difficult for the driver to operate the motor vehicle. Another form of debris is the collection of frozen water, in the form of ice or slush, around the wiper blades. In addition to lifting the wiper blade away from the windshield, the temperature of ice and slush hardens the wiper blade in a configuration which does not conform to the windshield. Therefore, even if the ice and slush are removed from the windshield, the effectiveness of the wiper blade is not optimal if ice remains alongside the wiper blade.

Several attempts have been made to incorporate debris-removing systems therein. These systems operate on the principle that by lifting the wiper arm and, hence, the wiper blade, away from the windshield, the debris that has been collected between the wiper blade and the windshield will be released allowing it to be pushed away by the air passing by as the motor vehicle moves forward. One such assembly is disclosed in U.S. Pat. No. 5,867,858, issued to Kelly on Feb. 9, 1999. In this reference, a wiper assembly is disclosed that includes a debris removing function thereof. The debris removing function takes the form of many embodiments, many of which require the interaction between a device that is secured to the wiper arm that cooperates with a device that is secured to the windshield. These systems are undesirable because a part of them will always be visible to those in the passenger compartment of the motor vehicle, regardless of whether the wiper assembly is even working. Other embodiments in this reference include plungers and camming devices that extend out and engage the windshield in order to remove the wiper blade from the windshield. These devices eventually damage the windshield by marking or scratching it and, as such, are undesirable. The final set of embodiments in this reference relate to vibration devices that are used to remove ice from the wiper blade. These systems are not designed to remove debris that may collect under the wiper blade and must be used in conjunction with the other types of embodiments discussed above to completely remove all debris, including frozen precipitation collecting on the wiper assemblies and wiper blades thereof.

SUMMARY OF THE INVENTION

Accordingly, the disadvantageous set forth above are overcome by using a wiper assembly for wiping a windshield of a motor vehicle. The wiper assembly includes a drive motor fixedly secured to the motor vehicle. The wiper assembly also includes a wiper arm secured to the drive motor. The drive motor pivots the wiper arm across the windshield to clean the windshield. The wiper arm extends between a motor end and a distal end. The wiper arm also includes a separator extending along the wiper arm. The separator lifts the wiper arm away from the windshield allowing for the removal of debris from the windshield and the wiper arm.

BRIEF DESCRIPTION OF THE DRAWINGS

Advantages of the invention will be readily appreciated as the same becomes better understood by reference to the following detailed description when considered in connection with the accompanying drawings, wherein:

FIG. 3 is a side view, partially cut away, of one embodiment of the invention with the wiper arm engaging the windshield;

FIGS. 4a through 4d are schematic representations of one embodiment of the invention in various points along one cycle of operation;

FIG. 6 is a side view of a wiper arm incorporating a second embodiment of the invention with a wiper pulled away from a windshield;

FIG. 7 is a side view of the second embodiment with a wiper arm engaging a windshield;

FIG. 9 is a perspective view, partially exploded, of a third embodiment of the invention;

FIG. 10 is a perspective view of the crank and post incorporating the third embodiment of the invention, partially cut away;

FIGS. 14a through 14g are top views, partially cut away of a sixth embodiment of the invention in various positions as it moves through a single cycle;

DETAILED DESCRIPTION OF THE PREFERRED EMBODIMENTS

Figure 1:
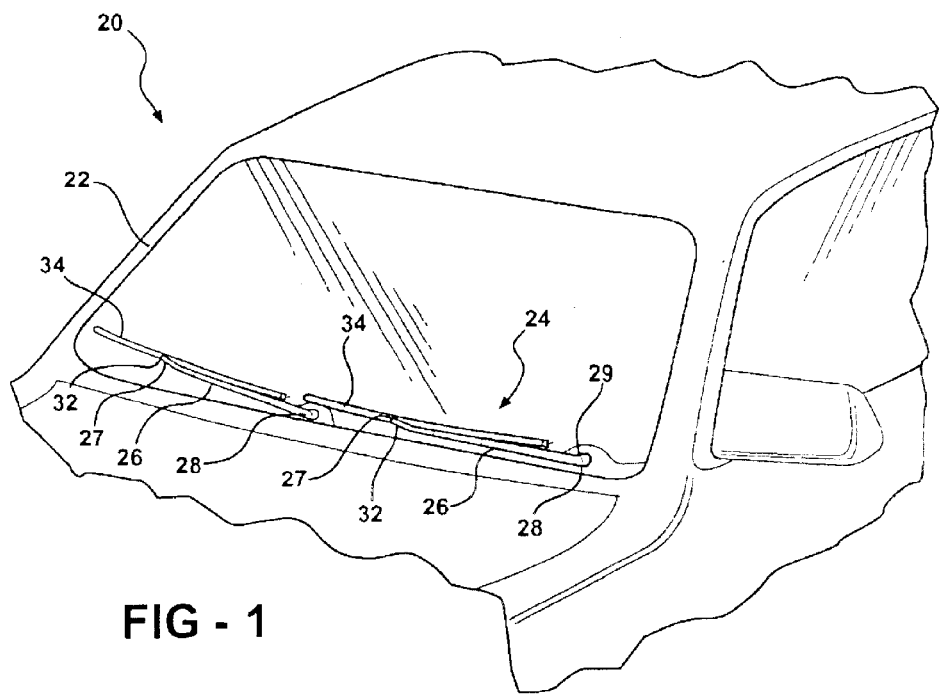
FIG. 1 is a perspective view of a motor vehicle, partially cut away, showing a wiper assembly incorporating one embodiment of the invention.

Referring to FIG. 1, a motor vehicle is generally shown at 20. The motor vehicle 20 includes a windshield 22 and a wiper assembly, generally indicated at 24. In this embodiment, the wiper assembly 24 includes two wiper arms 26 that are pivotally secured at a motor end 28 to a wiper post 30 (shown in FIG. 5). The wiper arms 26 extend between the distal ends 32 and lower ends 29. The lower ends 29 of the wiper arms 26 are operatively connected to the wiper posts 30 whereas the distal end 32 fixedly secured the wiper blade 34 thereto. Depending on the design, the wiper blade 34 includes a blade support 36 and an elastic blade 38. The two wiper arms 26 act in unison using a linkage, typically with the wiper arm 26 adjacent the driver side acting as a master and the wiper arm 26 adjacent the passenger side being the slave in a master/slave relationship. Reference will be made to one wiper arm 26 and because the two wiper arms 26 are identical for purposes of the invention, only one wiper arm 26 will be referenced hereafter.

Figure 5:
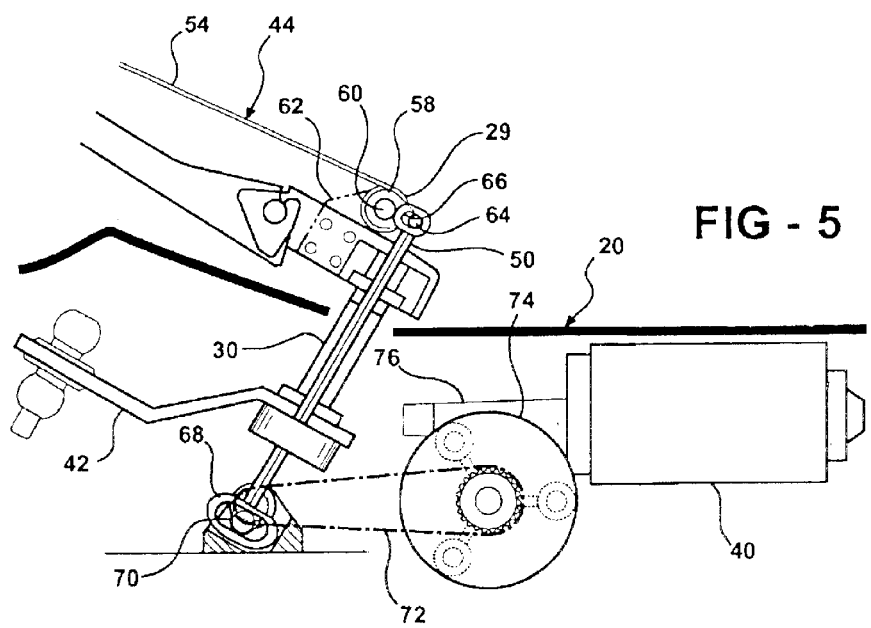
FIG. 5 is a side view of one embodiment of the invention detailing a transmission thereof.
Figure 2:
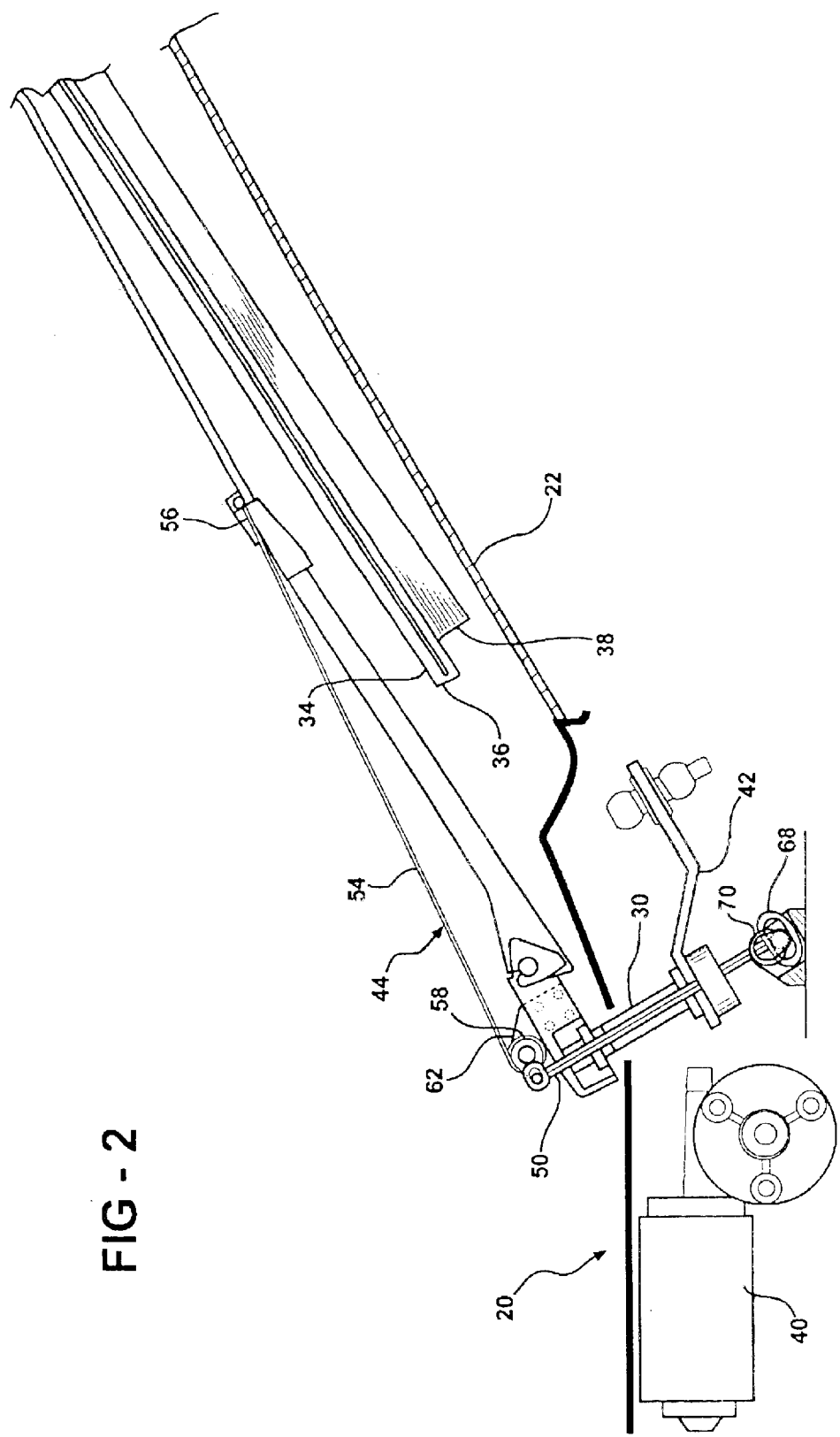
FIG. 2 is a side view of one embodiment of the invention with the wiper arm pulled away from the windshield.
Figure 8E:
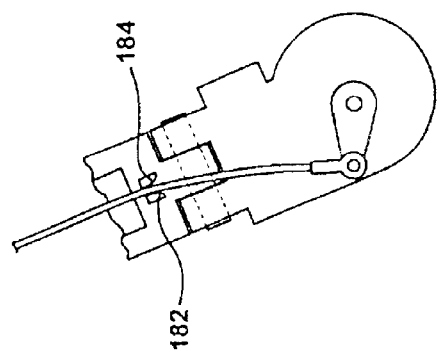
FIGS. 8a through 8e are top views of a wiper arm post and a portion of the second embodiment of the invention during various positions through a cycle of operation.
Figure 8B:
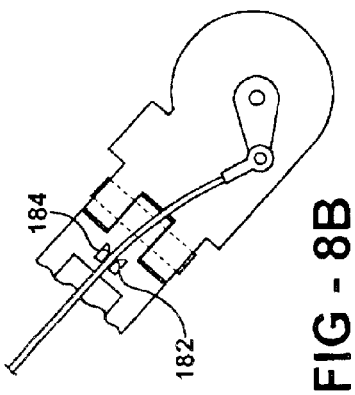
Figure 8D:
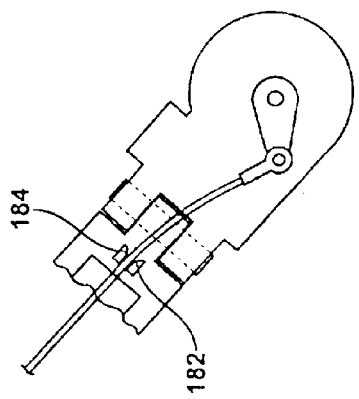
Figure 8A:
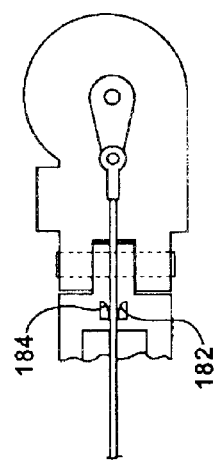
Figure 8C:
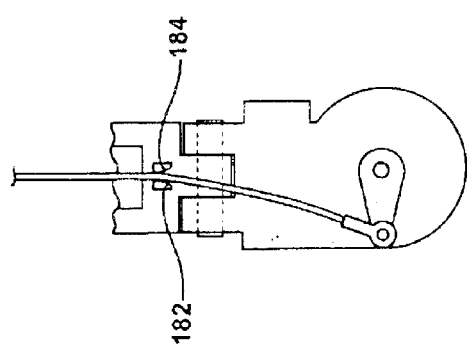
Figure 11A:
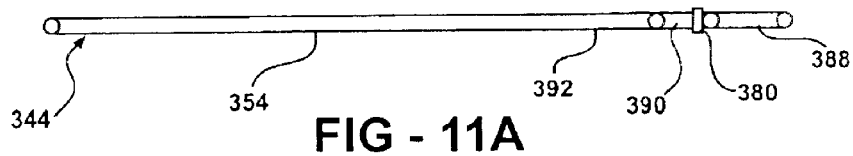
FIGS. 11a through 11d are top views of a third embodiment of the invention in various positions through a single cycle of operation.
Figure 11B:
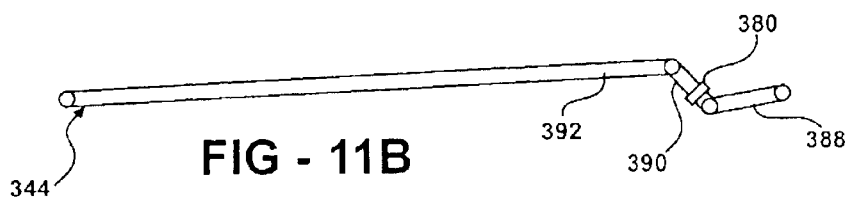
Figure 11C:
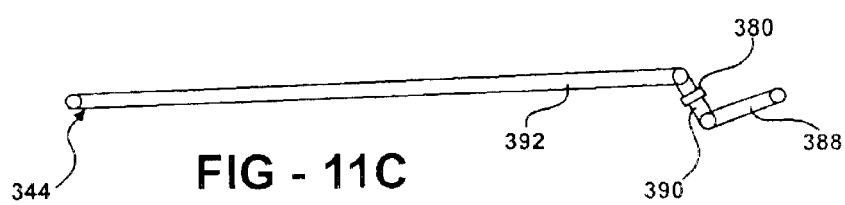
Figure 11D:
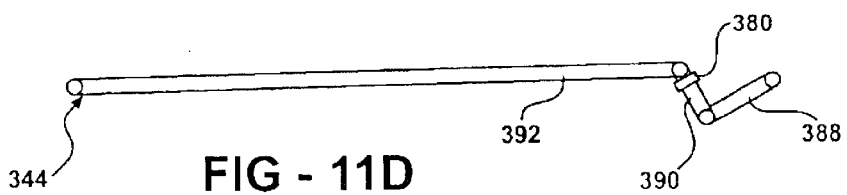
Figure 12:
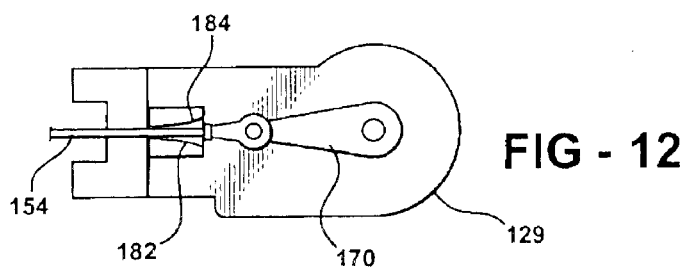
FIG. 12 is a top view, partially cut away of a second embodiment of the invention.

Referring to FIGS. 2, 3 and 5, the wiper assembly 24 includes a drive motor 40. The drive motor 40 is fixedly secured to the motor vehicle 20. The drive motor 40 is operatively connected to the wiper post 30. The connection between the motor 40 and the wiper post 30 will be discussed in greater detail subsequently. Extending out from the wiper post 30 is a drive lever 42. The drive lever 42 receives a force from a wiper motor (not shown) and is used to rotate the wiper post 30 and, therefore, the wiper arm 26. The wiper post 30 and the drive lever 42 are keyed in a manner known in the art providing the pivotal movement of the drive lever 42 is translated to the pivotal movement of the wiper arm 26. The rotation of the wiper arm 26 rotates the wiper blade 34 across the windshield 22 to clean the windshield 22 of debris and precipitation.

A separator, generally indicated at 44, extends along the wiper arm 26 and lifts the wiper arm 26 away from the windshield 22 allowing for the removal of debris therefrom. The separator 44 is movable between a use state and a relaxed state. The separator 44 also includes a component 46 that extends along the wiper post 30. In the first embodiment, the separator 44 extends through the wiper post 30 wherein the component is a first link 46 that extends through the wiper post 30. The first link 46 extends from a base end 48 and upper link end 50. The first link 46 extends through the wiper post 30, which extends between a base bushing 52 and the wiper arm 26.

The separator 44 also includes a wiper arm link 54. The wiper arm link 54 extends from the upper link end 50 to an intermediate position 56 along the wiper arm 26 between the upper 27 and lower 29 ends thereof. Extending between the first 46 and second 54 links is a bell crank 58. The bell crank 58 translates the movement of the first link 46 into movement of the wiper arm link 54. As the first 46 and second 54 links are oriented in positions generally perpendicular to each other, the bell crank 58 allows for the axial movement of the first link 46 to translate into a generally axial movement of the wiper arm link 54. The bell crank 58 pivots about a pivot axis 60 that is fixedly secured with respect to the lower end 29 of the wiper arm 26 using a mount 62. The bell crank 58 also includes a pin 64 at an end opposite the pivot axis 60. The pin 64 is received by a bell crank aperture 66 that is fixedly secured to the upper link end 50 of the first link 46.

Referring to FIGS. 4A through 4D, movement of the first link 46 is schematically represented. The base end 48 of the first link 46 includes a base aperture 68 that cooperates with a crank 70 to move the first link 46 up and down (as oriented in the FIGS. 4A through 4D) which moves the separator 44 between the use and relaxed states. The crank 70 is the element operatively connected to the drive motor 40, as is best seen in FIG. 5. A belt 72 interconnects the crank 70 and a gear set 74. The gear set 74 acts as a transmission that receives rotational force from a drive shaft 76 extending out from the drive motor 40. Therefore, rotational force generated by the drive motor 40 is translated from the drive shaft 76, via the gear set 74 and belt 72, to the crank 70 which moves the separator 44. Movement of the separator 44, in turn, moves the wiper blade 34 between the relaxed state that engages the windshield 22 (FIG. 3) and the use state where the wiper blade 34 is separated from the windshield 22 (FIG. 2). In the position where the elastic blade 38 is removed from the windshield 22, debris is released and is capable of being removed via airflow that is generated by movement of the motor vehicle 20 allowing the occupants of the passenger compartment to have a relatively clean view through the windshield 22 without having to exit the passenger compartment.

Referring to FIGS. 6 through 8, 10 and 12, a second embodiment of the invention is illustrated wherein like reference characters offset by 100 from those in the first embodiment, described above, represent similar elements and, as such, a discussion of which may be omitted. In the second embodiment, the wiper arm link 154 is flexible. Therefore, as shown in FIGS. 6 and 7, the wiper arm link 154 extends through a curved path. In this embodiment, the wiper arm link 154 is a cable capable of being pulled in a single direction.

Unlike the first embodiment, the separator 144 includes a crank 170 that is fixedly secured to the upper link end 150 of the first link 146. This crank 170 moves through a plane perpendicular to that which the bell crank 58 moves. The second embodiment of the separator 144 also includes a clutch 178 that is fixedly secured to the base end 148 of the first link 146. One type of clutch that can be incorporated into the preferred embodiment is manufactured by Ogura Clutch Co., Ltd having model # MCZB 40. The clutch 178 prevents rotation of the first link 146. More specifically, the clutch 178 is selectively engaged to prevent the first link 146 from rotating with the wiper post 130 and wiper arm 126. In normal operation, the first link 146 rotates in unison with the wiper arm 126 as it pivots thereabout. When the clutch 178 is engaged, the first link 146 maintains its orientation and does not rotate as the wiper arm 126 pivots. This causes a difference in orientation between the crank 170 and the wiper arm 126. The difference between the two forces the wiper arm link 154 to extend through a curved path that is greater than the path through which it normally extends. The curved path is exaggerated by a guide 180 that is fixedly secured to the wiper arm 126. The guide 180 defines a channel 182 (best seen in FIG. 12). The channel 182 includes a mouth 184 which widens as it extends toward the crank 170. This allows for the wiper arm link 154 to extend therealong while minimizing the wear thereon.

As may be appreciated from the discussion above, the first link 146 of the second embodiment differs from the first link 46 of the first embodiment in that the first link 146 does not move axially. The first link 146 of the second embodiment moves in a rotation about a central axis. By rotating the first link 146 of the second embodiment, the second embodiment of the separator 144 does not require the bell crank 58 of the first embodiment. It is the clutch 178 that allows for the natural difference created by the pivoting of the wiper arm 126 during normal operation to affect the difference between the lengths of the wiper arm link 154 and an active state resulting in the wiper arm 126 being pulled away from the windshield 22.

Referring to FIG. 9, a third embodiment of the invention is disclosed wherein like elements thereof are offset from those elements in the first embodiment by 200, the separator is generally indicated at 244. In the third embodiment, the guide 280 extends along much of the length of the wiper arm 226 between the lower end 229 and the intermediate position 256. In this embodiment, the wiper arm link 254 is a cable capable of extending through a curved path. The guide 280 includes a channel 282 extending through the entire length of the guide 280.

A cover 286 extends over the entire guide 280 covering the guide channel 282 and the portion of the wiper arm link 254 that extends therethrough. The cover 286 is plastic and retains the wiper arm link 254 within the channel 282 ensuring the path through which the wiper arm link 254 must traverse during the activation of the separator 244 is the longer of the two paths through which it must extend. As may be appreciated by those skilled in the art, if the plastic cover 286 was not incorporated into the use of this third embodiment, the separator 244 would be less effective because the wiper arm link 254 would leave the channel 282 as the wiper arm 226 moved away from the windshield 222.

Referring to FIG. 11, a fourth embodiment of the wiper arm link 354 is shown for a separator 344. The wiper arm link 354 is a linkage comprising three non-flexible links 388–392. Upon engagement of the clutch (not shown in FIGS. 11A through 11D), the links 388–392 for the wiper arm link extend through a curved path due to a guide 380. The guide 380 is a sleeve that is mounted to the wiper arm and allowed to rotate as the second or middle link 390 of the wiper arm link is forced to rotate due to the orientation of the first link 388 and its connection to the third link 392. The first link 388 is the crank 70, 170, 270 of the first three embodiments. The fourth embodiment 344 incorporates the use of a clutch as did the second and third embodiments 144, 244.

Figure 13:
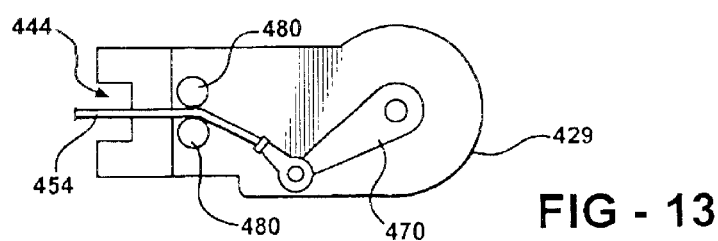
FIG. 13 is a top view, partially cut away, of a fifth embodiment of the invention.
Figure 15A:
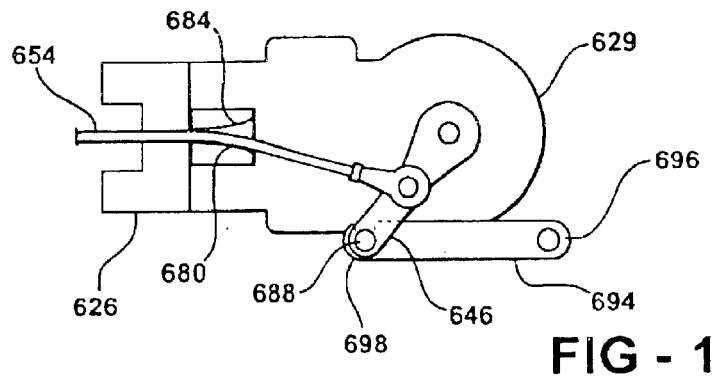
FIGS. 15a through 15c are top views, partially cut away of a seventh embodiment of the invention in various positions as it moves through a single cycle.
Figure 15B:
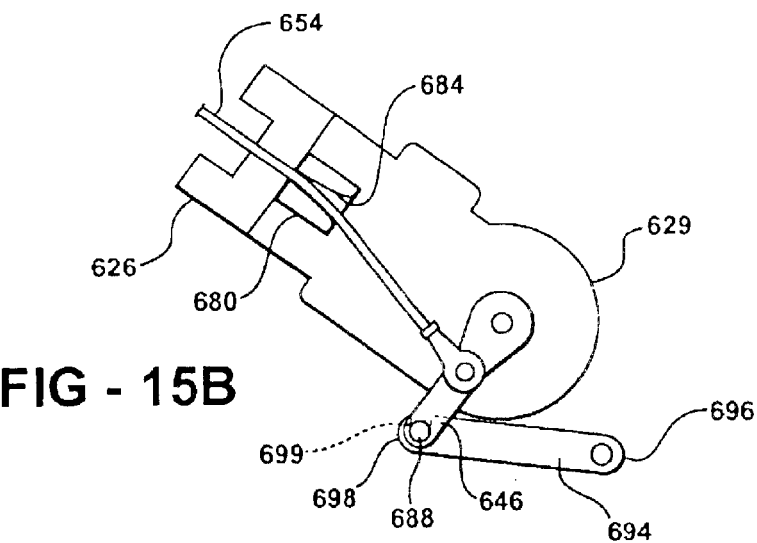
Figure 15C:
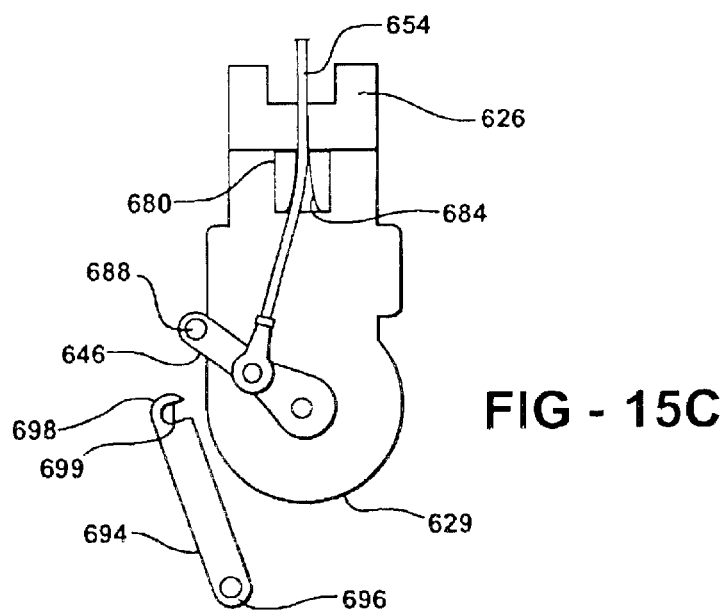

Referring to FIG. 13, a fifth embodiment of the separator 444 is shown wherein the guide 480 includes two cylinders through which the wiper arm link 454 extends. The roundness of the cylinders 480 along its side walls obviates the need for the mouth 184 that is incorporated into the channel 182 of the second embodiment of the separator 144.

In operation, the wiper assembly 24 is rotated to clean the windshield 22. The separator 44 is selectively activated by a manually operated switch (not shown) when debris is caught between the windshield 22 and the elastic blade 38. When the separator 44 is activated, the wiper arm link 54 extending along a portion of the wiper arm 26 is forced to extend through a path that differs than the path through which the access of the wiper arm 26 extends. This creates a difference between the wiper arm 26 and the wiper arm link 54. The difference in paths is compensated for when the wiper arm 26 is forced to overcome its spring bias against the windshield 22, thus pulling it away from the windshield 22 allowing the debris to be released therefrom.

Referring to FIGS. 14A through 14G and 15A through 15C, sixth and seventh embodiments, respectively, of the separator 544, 644 are shown. In these embodiments, the first link 546, 646 engage a clasp 594, 694 that extends between a post end 596, 696 and a clasp end 598, 698. The clasp 594, 694 has a relief 599, 699 that receives a first link 588, 688 of the wiper arm link 554, 654 therein. In the sixth embodiment, the lower end 529 of the wiper arm 526 includes a releasing detent 597. When the wiper arm 526 pivots to a orientation where the releasing detent 597 engages the clasp 594, the releasing detent 597 forces the clasp 594 into an orientation wherein the first link 588 disengages the relief 599 of the clasp 594 resulting in the sudden release of the first link 588. This results in the immediate return of the wiper arm 526 to the windshield 522. The sudden release of the wiper arm 526 creates an impulse that is preferred in situations where the wiper arm 526 is frozen or in situations where the wiper arm 526 collects slush. By the immediate releasing of the separator 544 from engagement with the wiper arm link 554. The wiper arm 526 can utilize its built-in spring bias to create an impulse between the elastic blade 538 and the windshield 522. This impulse breaks the elastic blade 538 free from the frozen precipitation thereat, thus optimizing the performance of the elastic blade 538 in colder climates.

Figure 16:
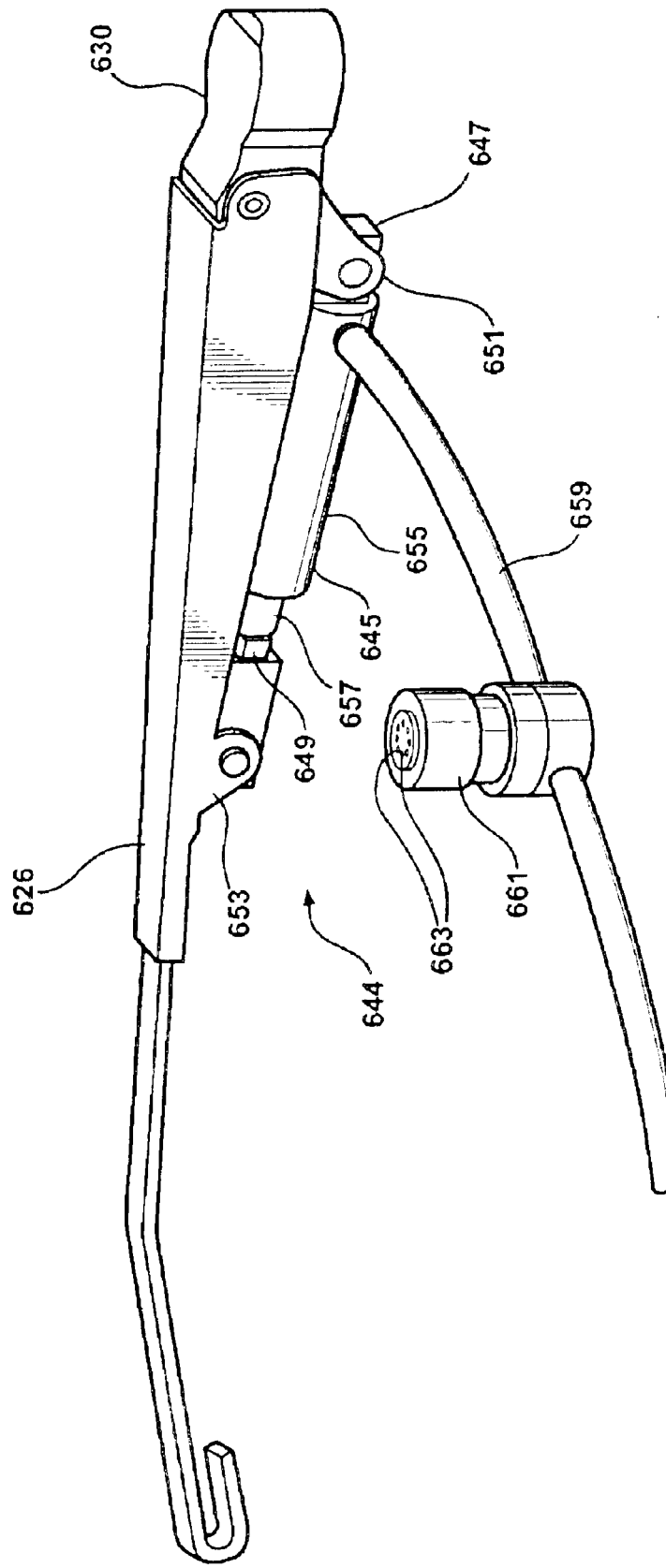
FIG. 16 is a perspective view an eighth embodiment of the invention.

Referring to FIG. 16, a perspective of an eighth embodiment of the separator 644 is generally shown. The separator 644 includes a pneumatic cylinder 645 that extends between a base end 647 and a wiper end 649. The pneumatic cylinder 645 is connected to base 651 and wiper 653 extensions that are designed to typically hold a spring (not shown). In the wiper arm assemblies, the spring is used to maintain contact between the wiper blade and the windshield. In an alternative, the pneumatic cylinder could be a dual acting air cylinder replacing the need for the spring.

When wiper arm 626 is to be separated from the windshield, a fluid is fed into the pneumatic cylinder 645 to extend the wiper end 653 from the base end 651. The base end 651 is operatively connected to the wiper post 630 and the wiper end 653 is connected to the wiper arm 626. The pneumatic cylinder 645 includes two cylinder parts 655, 657 that telescope with respect to each other. In the preferred embodiment, the fluid is air and the pneumatic cylinder is a Bimba air cylinder Model # 040.5-p. The air is fed to the pneumatic cylinder 645 via a feed line 659. The feed line 659 includes a valve 661, a Clippard Minimatic, Model # ET-3-12, that regulates when air is forced into the pneumatic cylinder 645. In yet another embodiment, the valve 661 may be replaced with an air switch, similar to one manufactured by Pneumadyne, Inc., Model # A0-30-3. Once the valve 661 closes, it exhausts the pressure within the pneumatic cylinder through exhaust vents 663 allowing the wiper arm 626 to return to the windshield. The opening and closing of the valve 661 may be manual or automatically controlled. It should be appreciated by those skilled in the art that other models and makers of the parts set forth above may be used in the place thereof without adding an inventive concept to the invention disclosed herein.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

We claim:

1. A wiper assembly for wiping a windshield of a motor vehicle, said wiper assembly comprising:

a drive motor fixedly secured to the motor vehicle;

a wiper arm secured to said drive motor, said drive motor pivoting said wiper arm across the windshield to clean the windshield, said wiper arm extending between a motor end and a distal end;

a separator extending along said wiper arm for lifting said wiper arm away from the windshield allowing for removal of debris therefrom, said separator including a wiper arm link and a crank to move said separator between a use state and a relaxed state wherein said use state forces said wiper arm away from the windshield and said relaxed state allows said wiper arm to engage the windshield, said wiper arm link being flexible and extending through a curved path from said crank to an intermediate wiper arm position between said distal and motor ends thereof; and a guide for guiding said wiper arm link therealong.

2. A wiper assembly as set forth in claim 1 wherein said guide defines a channel for receiving a portion of said wiper arm link therein.

3. A wiper assembly as set forth in claim 1 wherein said guide defines a mouth for directing said wiper arm link therethrough.

4. A wiper assembly as set forth in claim 3 including a cover fixedly secured to said wiper arm over said guide and said wiper arm link preventing said wiper arm link from moving out of said channel.

5. A wiper assembly for wiping a windshield of a motor vehicle, said wiper assembly comprising:

a drive motor fixedly secured to the motor vehicle;

a wiper arm secured to said drive motor, said drive motor pivoting said wiper arm across the windshield to clean the windshield, said wiper arm extending between a motor end and a distal end;

a separator extending along said wiper arm for lifting said wiper arm away from the windshield allowing for removal of debris therefrom, said separator including a crank and a wiper arm link, said crank being selectively immovable during the pivoting of said wiper arm to force said wiper arm link to extend through a curved path such that said wiper arm link lifts said wiper arm away from the windshield allowing for the removal of debris collecting therebetween.

6. A wiper assembly as set forth in claim 5 including a guide for guiding said wiper arm link therealong.

7. A wiper assembly as set forth in claim 6 wherein said guide defines a channel for receiving a portion of said wiper arm link therein.

8. A wiper assembly as set forth in claim 6 wherein said guide defines a mouth for directing said wiper arm link therethrough.

9. A wiper assembly as set forth in claim 8 including a cover fixedly secured to said wiper arm over said guide and said wiper arm link preventing said wiper arm link from moving out of said channel.

* * * * *